April 11, 1944.  H. O. PUTT  2,346,606
REVERSIBLE HYDRO-MECHANICAL TRANSMISSION
Filed Oct. 7, 1941  5 Sheets-Sheet 1

Inventor
H. O. Putt
By Lester L. Sargent
Attorney

April 11, 1944.  H. O. PUTT  2,346,606
REVERSIBLE HYDRO-MECHANICAL TRANSMISSION
Filed Oct. 7, 1941  5 Sheets-Sheet 2
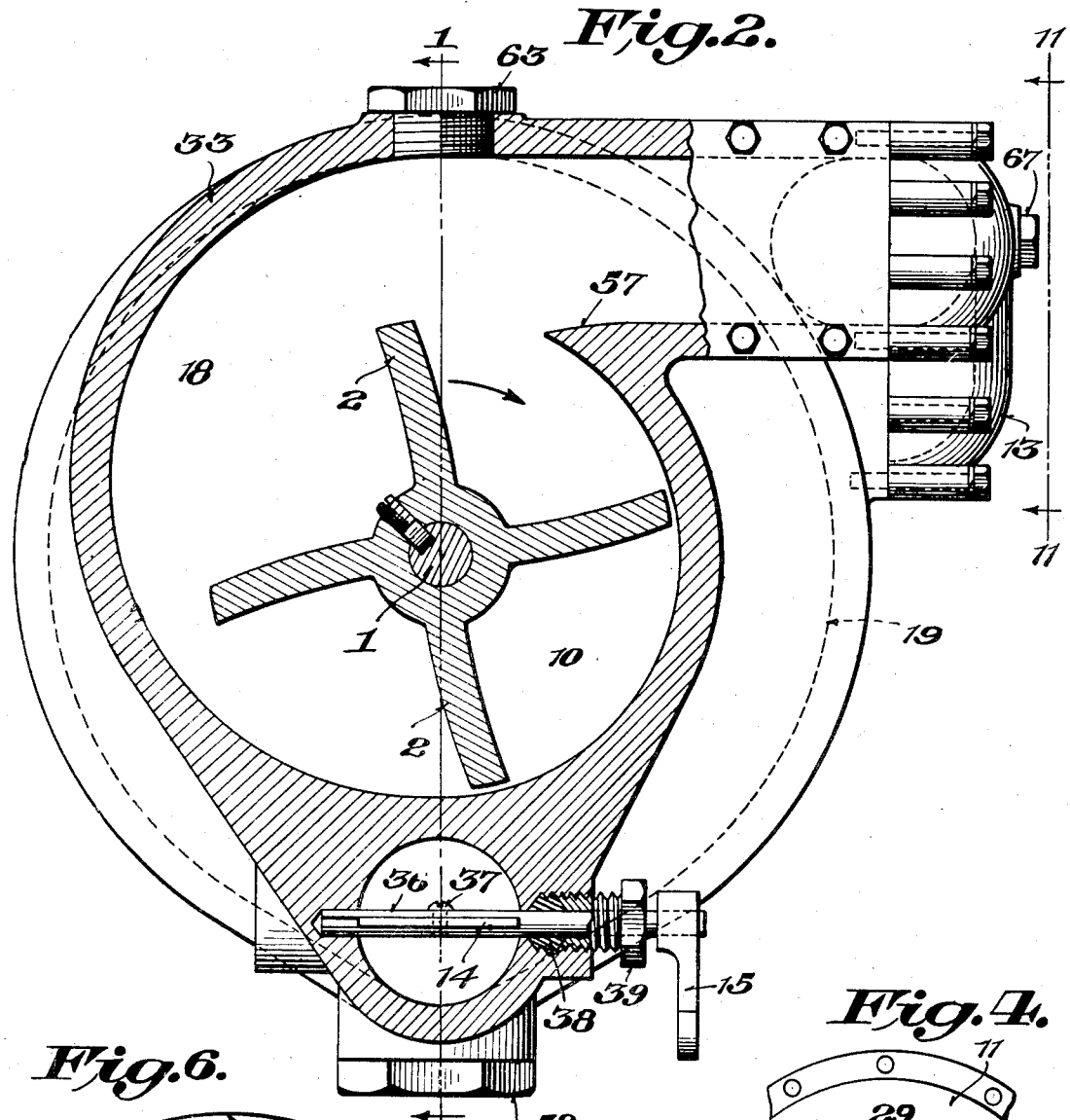
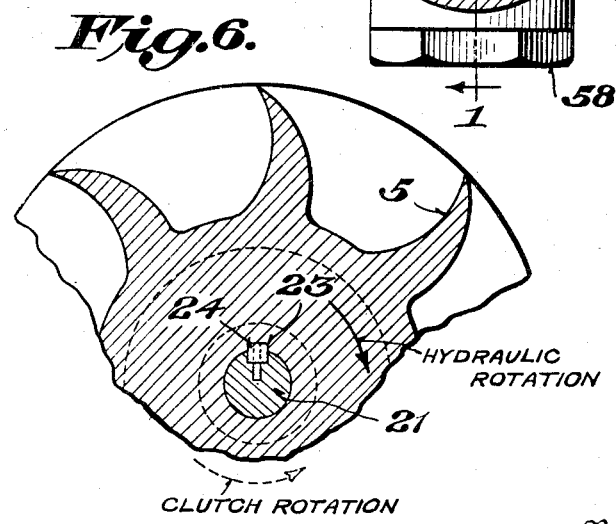
Inventor
H. O. Putt,
By Lester L. Sargent
Attorney

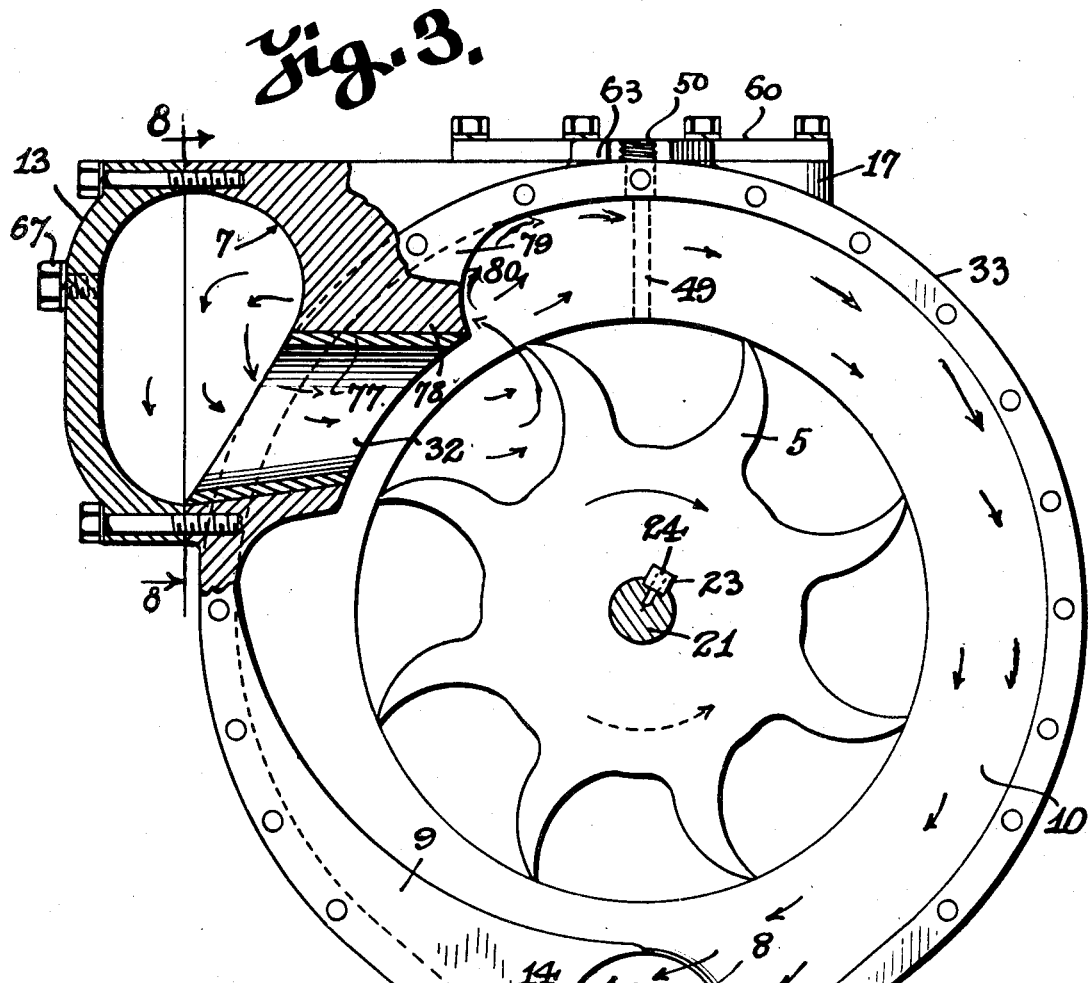
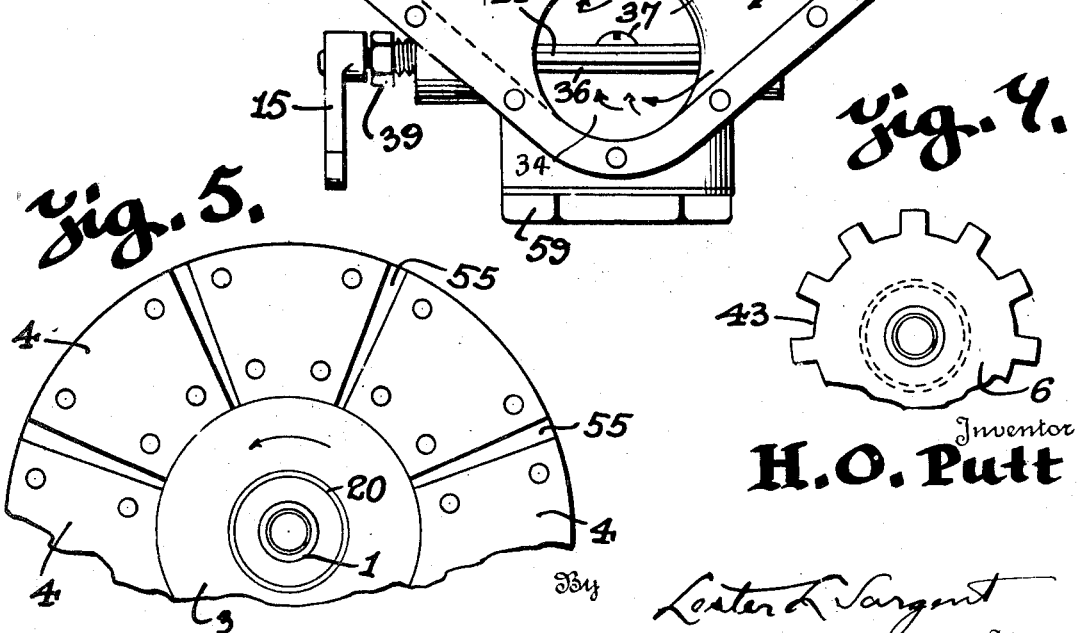

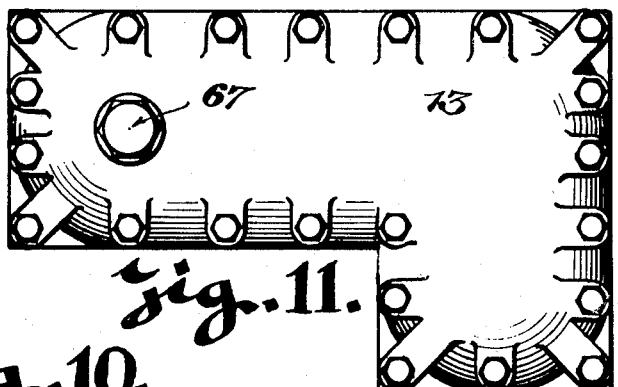
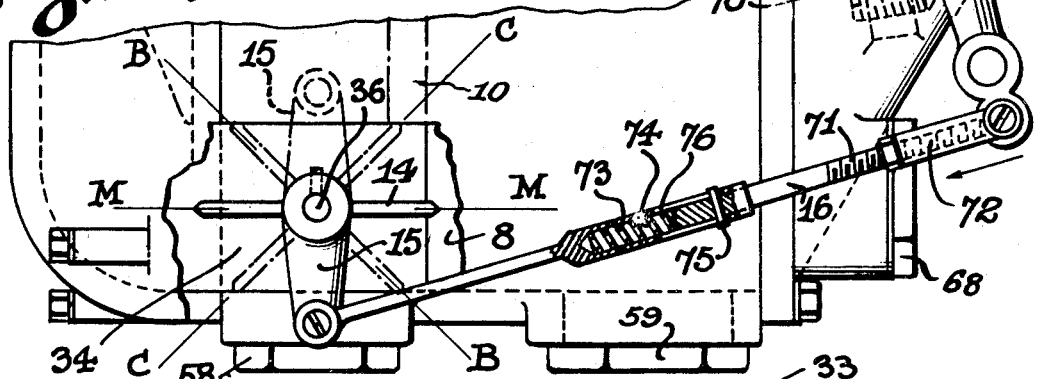
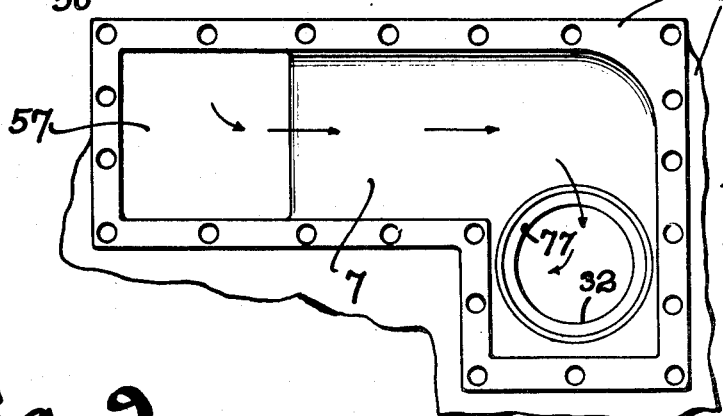
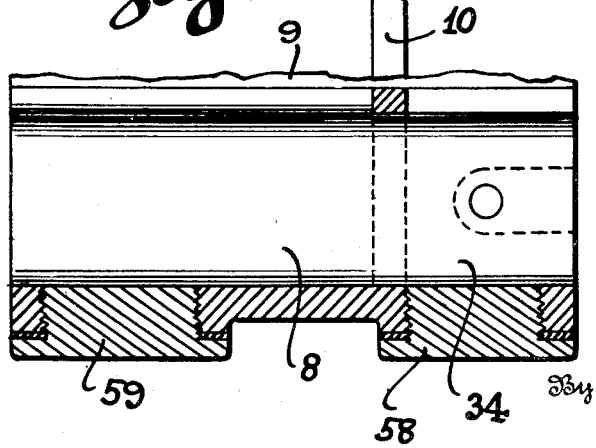

April 11, 1944.  H. O. PUTT  2,346,606
REVERSIBLE HYDRO-MECHANICAL TRANSMISSION
Filed Oct. 7, 1941  5 Sheets-Sheet 5
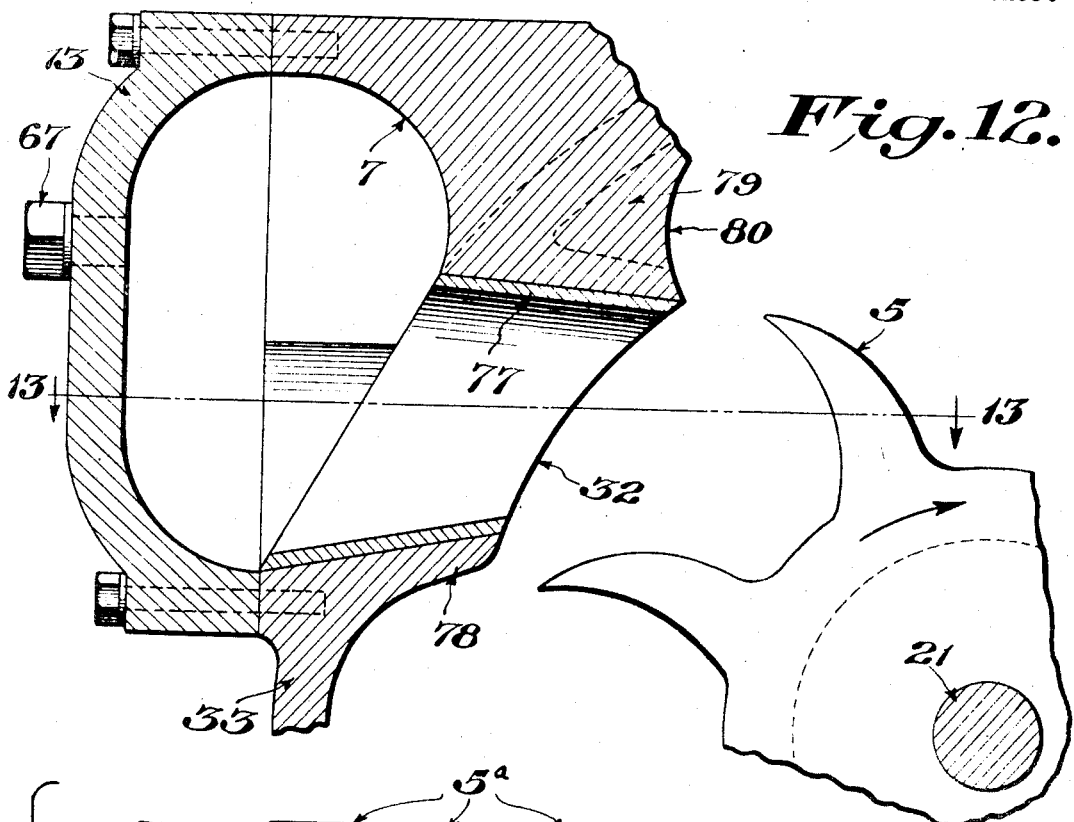
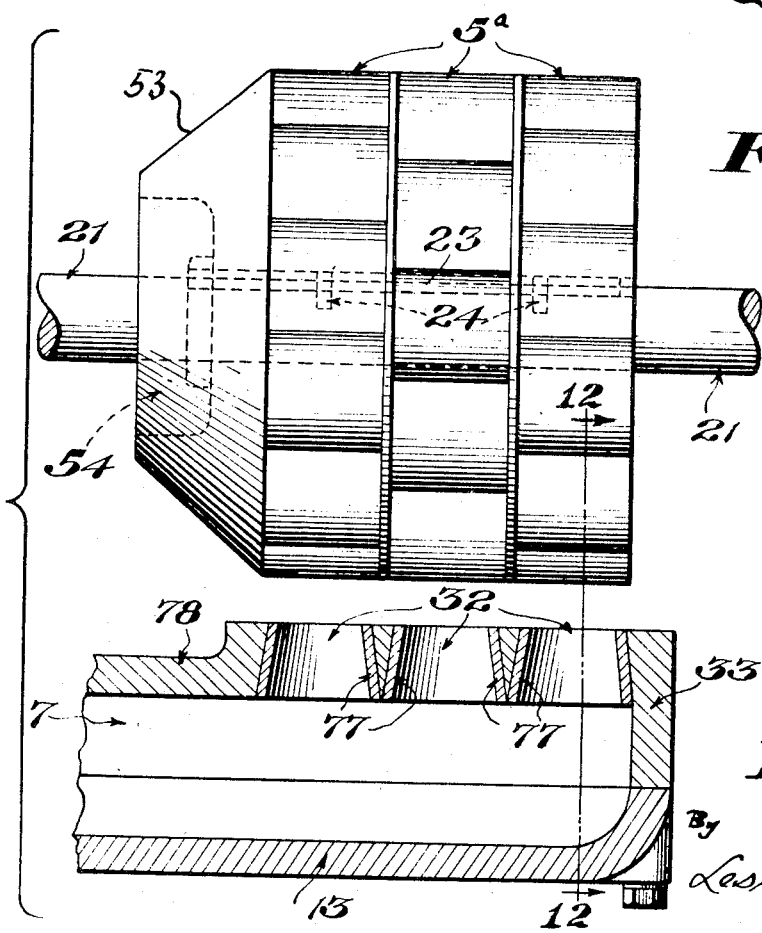
Inventor
H. O. Putt
By Lester Sargent
Attorney Patented Apr. 11, 1944

2,346,606

UNITED STATES PATENT OFFICE 2,346,606

REVERSIBLE HYDROMECHANICAL TRANSMISSION

Harlie O. Putt, Elkhart, Ind.

Application October 7, 1941, Serial No. 413,981

16 Claims. (Cl. 192—3.2)

This invention relates to improvements in power transmission apparatus and has for its first object, the transmission of power in one direction of rotation by hydraulic means and in the opposite direction of rotation by mechanical means, through the combination of a centrifugal pump, friction clutch and hydraulic turbine, suitably arranged within one housing unit and so disposed and operated in relation to each other as to constitute a new and improved power transmission device.

It is the purpose of this invention to provide a vibrationless flow of power, through controllable hydraulic means, in one direction of rotation of the turbine element and means to accomplish a quick reversal of direction of rotation through the medium of a suitable clutch action, the speed and power of the latter being dependent upon the pressure applied to said clutch. In other words, dependent upon clutch slippage.

Another object is to provide means whereby hydraulic action is completely stopped at, or before, the instant of clutch engagement, so as to prevent conflict of driving forces in certain applications of the device.

A further object is to provide means whereby the value or degree of power transmitted and also the speed of rotation of the driven shaft may be increased or decreased or completely stopped while the centrifugal pump rotor is rotating at any given speed.

It is a further object to provide a suitable housing for the co-related parts, with a definite minimum fluid content and means to force this fluid to circulate under pressure and transmit power in one direction of rotation by reason of the impact of said fluid against the vanes of a suitable hydraulic turbine rotor within said housing.

It is also an object to provide means whereby fluid may be drawn from an external source by the pump, forced against the said turbine rotor and exhausted externally.

Another object of the invention is to provide means whereby the centrifugal pump rotor and one rigidly keyed member of the clutch always rotate in the same direction at the same speed, while the turbine rotor with its integral clutch face, may rotate in either direction at various speeds.

It is another object of the invention to provide a structure and means whereby an effective and powerful power-brake effect is obtained by stopping fluid flow and engaging clutch when the turbine is running in the clockwise direction, or by releasing clutch and starting fluid flow when the turbine is running in an anti-clockwise direction, as viewed from the turbine end.

It is also an object to provide means whereby the control of fluid flow and clutch action may be synchronized, or by disconnecting said means, each of the aforesaid control elements may be operated independently of the other by manual or other means.

It is a further purpose to provide a simple, compact and inexpensive structure, for any desired application, whereby power may be transmitted at all speeds and power factors within the capacity of the device and whereby the said power, so transmitted, may be instantly controlled in either direction of rotation, with or without conflict of driving forces, while the driving element always rotates in but one direction.

I attain these and other objects of my invention by the apparatus shown in the drawings, in which—

Fig. 2 is a view of the drive end of the transmission partly in elevation and partly in section on line 2—2 of Fig. 1;

Fig. 3 is a view of the rear end of the transmission partly in elevation and partly in section on line 3—3 and 6—6 of Fig. 1;

Fig. 4 is an internal view partly in plan and partly in section of a portion of the cone-shaped end cover, reduced size, on line 3—3 of Fig. 1, showing reversing mechanism;

Fig. 5 is a plan view of a portion of the concave face of the clutch member, showing clutch lining sectors riveted to it;

Fig. 6 is a section of a portion of the turbine rotor on line 6—6 of Fig. 1;

Fig. 7 is a detail end plan view of a portion of the notched packing gland nut;

Fig. 8 is a side elevation of the high pressure fluid channel on line 7—7 of Fig. 3;

Fig. 9 is a view partly in section and partly in elevation of the low-pressure channel showing baffle extending from rear face of housing to the partition of said housing;

Fig. 10 is a side elevation partly in section, of the transmission unit showing the three positions of the fluid control valve, its operating lever, compressible rod or link and the reversing lever with which it is interconnected;

Fig. 11 is a side elevation of the cover plate for the high-pressure fluid channel 7 taken on line 11—11 of Fig. 2;

Fig. 12 is a sectional view of one nozzle and one rotor section approximately on the line 12—12 of Fig. 13; and Fig. 13 is a plan view of a modification showing a multiple turbine rotor and multiple nozzle taken approximately on the line 13—13 of Fig. 12.

Figure 1:
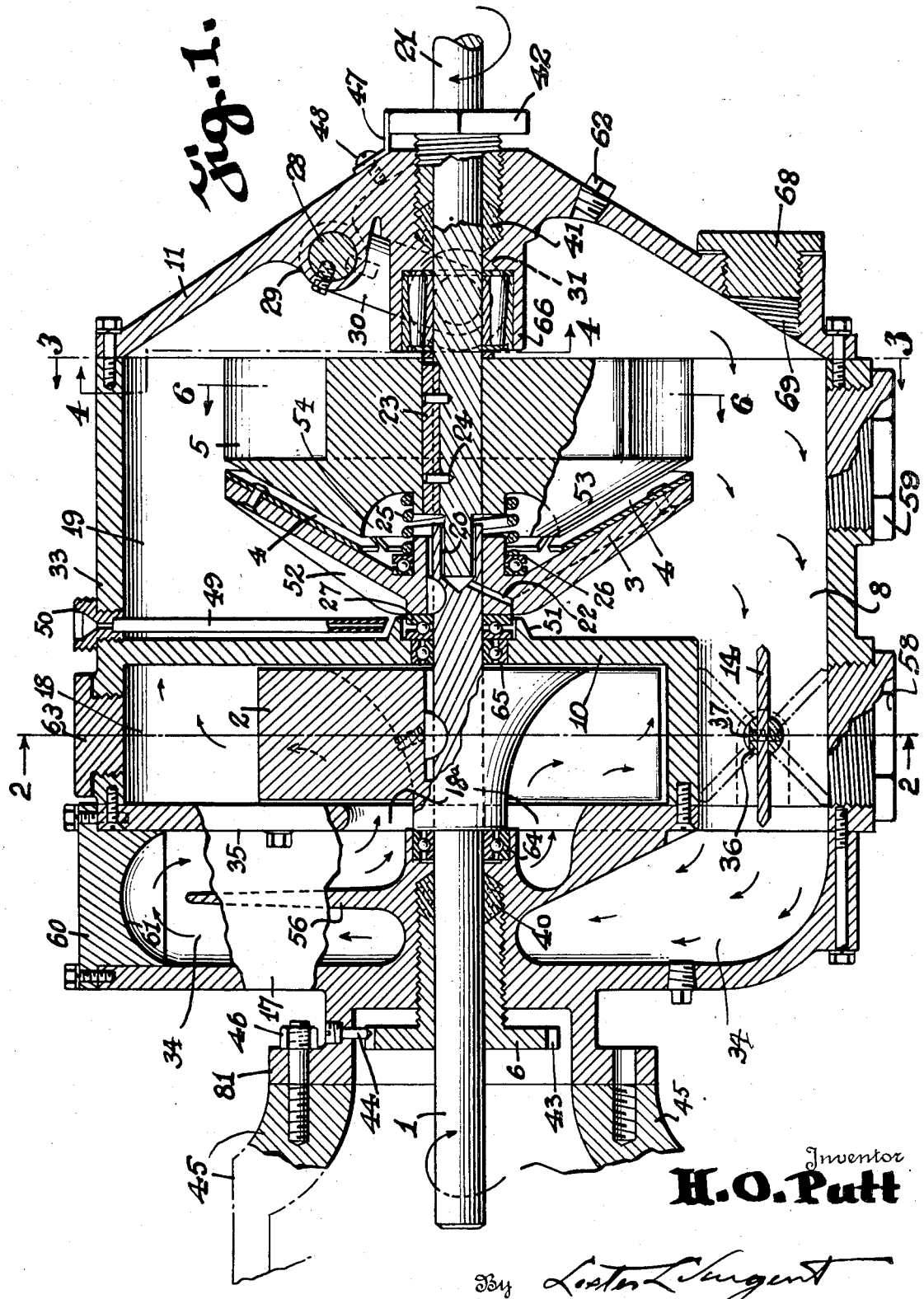
Figure 1 is a longitudinal section on a central line through the invention, portions of the device being shown in elevation on line 1—1 of Fig. 2.

Referring to the accompanying drawings, and especially to Fig. 1, I provide a drive shaft 1 on which a centrifugal pump rotor 2 is mounted. Also secured to the drive shaft is a cone-shaped clutch plate 3. Clutch lining pieces 4 are equally spaced apart and riveted to the concave face of clutch plate 3. Driven shaft 21 carries a turbine rotor 5. A threaded packing nut 6 is mounted on one end of drive shaft 1, as shown in Fig. 1. A high pressure channel 7 (shown in Fig. 8) extends from the pump outlet 57 to the nozzle 77 (Fig. 3). 8 designates a sump or lower section of the housing 33. As shown in Fig. 3, a circular faced baffle 9 extends from the rear face of partition or housing 10 which divides housing 33 into two compartments 18 and 19. Partition 10 forms one wall of the pump housing. I provide a rear cover 11, of cone shape, as shown in Figs. 1 and 4. 13 designates the high pressure manifold cover in which is mounted a screw plug 67 (Fig. 2). A reverse lever 12 (shown in Fig. 10) is secured at one end to rocker shaft 28.

An elliptical disc valve 14 which functions as a fluid control valve, is positioned in the suction channel 34. This valve has an operating arm 15, as shown in Fig. 10. The valve operating arm 15 is operatively connected with the reversing lever 12 by the compressible rod 16, whereby to synchronize the movement of fluid control valve 14 and reversing lever 12.

Referring to Fig. 1, the drive shaft 1 extends through the pump head or suction head 17, pump rotor compartment 18 and into the turbine clutch compartment 19 of the housing 33. It is provided with a suitable journal bearing sleeve or bushing 20 at the inner end. Member 20 forms a bearing for the reduced end of the turbine shaft 21, as shown in Fig. 1. Lubrication of this bearing is provided through the hole 22.

The pump rotor 2 and the clutch member 3 are rigidly keyed to the shaft 1. The turbine shaft or driven shaft 21 is provided with a long key 23 which is pinned in place by the two pins 24, or otherwise secured to the shaft, and on shaft 21 and key 23, turbine rotor 5 is slidably mounted. A compression spring 25 is centrally positioned between clutch member 3 and turbine 5. and serves to maintain separation of the clutch surfaces while the turbine is rotating under hydraulic action. One end of the spring 25 abuts on end thrust ball-bearing 26 which relieves all torsional stresses on the spring 25 when the clutch member 3 and the turbine rotor 5 are rotating in opposite directions. The end thrust bearing 27 takes the thrust of the clutch pressure when the clutch members 3 and 5 are brought forcibly together.

Referring to Fig. 4, there is illustrated a portion of the rear cover 11, in the boss 29 of which is journalled the rocker shaft 28. Two spaced, aligned arms 30 and 30a are rigidly keyed or fastened to rocker shaft 28. These two arms are slotted at their outer extremities and fitted with ball bearing rollers 31 and 31a respectively, which normally rest out of contact with the rear face of the turbine rotor 5, as shown in dotted lines in Fig. 1.

32 designates the nozzle of high pressure channel 7, shown in Fig. 3, hereinafter more fully described.

The housing 33 (see Figs. 1 and 8) is divided into the two compartments, the pump rotor compartment 18 and the turbine clutch compartment 19, by the partition 10, except the extreme lower section or sump 8, which when valve 14 is opened, communicates with the suction channel 34, in suction head 17, and thence to central intake 18a of the centrifugal rotor compartment 18. Partition 10 forms one wall of the pump rotor compartment 5, while the end plate 35 covers the compartment or channel 34 of the suction head 17, as shown in Figs. 1 and 2, forming the opposite wall.

The elliptical disk valve 14 is centrally positioned in the suction channel 34, and is centrally secured in the slotted shaft 36 by means of the screw 37. A packing gland 38 and compression nut 39, as shown in Fig. 2 are provided for the shaft 36 to prevent leakage of fluid past said shaft when the device is at rest. This valve fits snugly in the channel 34 but turns easily to any position and will remain in any position regardless of fluid pressure velocity, because the fluid forces are always equal on each side of the valve shaft 36. The advantages of this type of valve and of its location in the suction channel 34 will be further explained later.

As shown in Fig. 1, the drive shaft 1 is provided with a suitable packing gland 40 and a threaded packing nut 6. The packing nut 6 has a circular flange the periphery of which is provided with notches 43; a set screw 44 engages between the notches and holds this nut firmly after same has been properly tightened. An adjustment may be accomplished by removing the screw 44, inserting a screw driver or other implement and prying the notched flange of packing nut 6 around to increase pressure on packing 40. This obviates the necessity of removing the entire transmission unit from its mounting bracket 45 (as shown in Fig. 1), and to which the circular flange 81 is secured by means of studs or bolts 46. The packing gland 41 on shaft 21 is easily accessible and adjusted by means of the gland nut 42, which is held in position by means of clip 47 which is secured to cover 11 by screw 48 or otherwise. The rocker shaft 28 may also be provided with packing gland if desired.

As shown in Fig. 1, a breather tube 49 is soldered or otherwise secured to a threaded channel member 50 which is securely screwed into the housing 33 on the top side of the turbine clutch chamber 19 and positioned close to the partition wall 10. The lower end of this tube 49 is preferably beveled and positioned close to the top side of the circular flange 51 of the partition 10, as shown, the purpose and function of which will hereinafter be fully explained.

The cone-shaped clutch plate 3 is provided with ribs 52 on its outer side, these ribs being radially disposed to strengthen this member. The cone-shaped face 53 of the turbine rotor 5 is provided with the same angle or bevel as that of the clutch plate 3 and has a central bored out portion or chamber 54 to provide space for the compression spring 25. The clutch lining segments 4 are equally spaced and are riveted to the inner face of the cone-shaped clutch plate 3, leaving spaces 55 between them. The purposes of these spaces or slots is to permit immediate and thorough centrifugal discharge of any fluid that may be in the chamber 54 or vicinity when the clutch members are forced together while the device is in operation.

A baffle plate 56, as shown in Figs. 1 and 2, is cast integral with the suction head 17 and extends upward above the top level of the centrifugal pump rotor 2 and provides for a self-priming action of the pump in the conventional manner. The arrows starting at the sump 8 and extending through channel 34 and up over the baffle plate 56 and into the pump intake 18a, and out from the pump outlet 57 (see Fig. 8) along the high pressure channel 7 and into the nozzle 77 (Figs. 8 and 3) and thence against the turbine vanes and finally down to the sump 8, indicating the path and directional flow of fluid when the device is in hydraulic operation and the same fluid is used continuously.

When minimum fluid volume is continuously employed within the housing, screw plug 67 (shown in Figs. 2 and 3), and plug 68 (shown in Figs. 1 and 10) may be removed and suitable pipe connections inserted to provide attachment of any type of radiator or cooling device, whereby a portion of the fluid may be by-passed through said radiator (not shown) and returned to the transmission sump 8 through the orifice at 69, which is at other times closed by plug 68, as shown in Fig. 1.

As shown in Fig. 1, a suitable cap 60 is provided for the top of the suction head 17, the inside portion of cap 60 being rounded at 61 to facilitate fluid flow around the top of baffle plate 56. Cap 60 is secured in place by suitable fastening means. A filler plug 63 is threaded into the top section of the pump rotor compartment 18. A small pipe plug 62 is positioned in the end cover 11. To fill the housing with the proper amount of fluid, plugs 62 and 63 are removed and fluid is poured in at the threaded opening for the plug 63 until it starts running out at the opening normally closed by plug 62; then both plugs are securely replaced.

Suitable ball bearings 64 and 65 (see Fig. 1) are provided for the drive shaft 1; and a roller bearing 66 is provided for the driven shaft 21 when oily fluid is employed, but these bearings, as well as the end thrust bearings 26 and 27, may be replaced with suitable canvas-Bakelite journal bearings and end-thrust washers whereby water may be substituted for the oily fluid, as water is a lubricant for such material. Any suitable coupling device may be employed on the drive end of shaft 1 and on the outer end of driven shaft 21.

The suction head 17 is preferably formed integral with its end plate 35 and is securely held in position by means of cap screws or bolts, as shown in Fig. 2. Likewise, end plate 11 (Fig. 1) cover plate 13 (Fig. 3) and cap 60 are held in position by cap screws or bolts and all of these members are provided with suitable gaskets.

The functional operation of this transmission device is extremely simple, smooth and effective. The speed of the centrifugal pump must, of course, be stepped up to a point where it will displace a minimum of fluid per minute in order to develop sufficient fluid pressure to start the turbine rotor and keep it turning under a given minimum load; while the required speed of the drive shaft will not be so high to handle the same minimum load when power is transmitted through clutch action, because the clutch slippage at minimum speed and load will not be as great as the fluid slippage.

As the speed of the pump and consequently the fluid displacement and pressure is increased, this difference in slippage decreases, because the efficiency of the pump and turbine rotor increase, while the same factor in respect to the clutch remains the same or slightly decreases until finally, at maximum pump speed and fluid pressure, this slippage differential will narrow down to negligible values, particularly if the maximum power transmission capacity of the clutch (effective frictional area and pressure) does not exceed the maximum power capacity of the hydraulic elements. It will be seen that I may decrease the area of the clutch friction segments, or I may limit the pressure that can be applied to the clutch members through the reversing lever, by providing a suitable stop, as shown in dotted lines at 70 (Fig. 10), whereby to accomplish a reduction of maximum clutch capacity, if it should be desired under any specific operating condition.

Now assume that the housing 33 has been filled to the proper level with suitable fluid, that is, to the level of plug 62, and that the shaft 1, properly connected to a source of power, has started to rotate in the direction indicated by curved arrow at drive end. This action causes the rotor 2 to quickly force all fluid in its compartment over into the turbine compartment, through the high pressure channel 7 (Figs. 3 and 8), and nozzle 32 (Fig. 3).

The displacement of this fluid sets up a vacuum effect in the suction head channel 34 and with valve 14 open, draws more fluid into the centrifugal rotor chamber 18 in the conventional manner. The fluid thus injected into the turbine chamber 19 impinges upon the vanes of the turbine rotor 5 and, if the pressure is great enough, causes turbine rotor 5 to start rotating in the opposite direction to that in which the pump rotor 2 is revolving, the fluid finally falling to the bottom of the turbine compartment or sump 8. From sump 8 it is again drawn through the suction channel 34 upward through the suction head channel and through opening 18a into pump compartment 18, as indicated by the arrows in Figs. 1, 3 and 8.

It will be noted that when the housing is first filled and also thereafter, when the transmission unit has been idle for an appreciable time, the fluid level in the pump chamber and suction head channel will fall to the level of the overflow plug 62. Part of this fluid seeps back into the turbine chamber through the ball-bearing 65, and part passes through the upper half of the suction head channel 34, thus leaving the pump rotor compartment only partly filled with fluid. However, because of the negligible lift involved, the pump rotor 2 will quickly displace the fluid remaining in this compartment. This operation creates a partial vacuum in the suction head and a quickly built up air pressure in the turbine compartment. The air pressure in the turbine compartment acts to push fluid therein back through the suction channel and into the pump compartment. Thus, a push-pull effect is simultaneously created, for the moment, which enables the pump to almost instantly prime itself and this is done before all the compressed air in the turbine compartment can escape through the small channel of the breather tube 49.

The exact amount of fluid and the position of the plug 62 will be accurately determined for various sizes of transmission units, so that this self-priming action will take place, even though the drive end of the transmission is elevated to an angle of 45 degrees, or more.

By maintaining a minimum quantity of fluid, approximately as described, the fluid content in the turbine compartment is also maintained at a minimum volume during hydraulic operation, thus leaving the turbine rotor free to rotate with minimum fluid drag, the arrows in Fig. 3 indicating the direction and position of the fluid when the turbine is running in the direction indicated.

When in operation with the control valve 14 open and regardless of the pump rotor speed, fluid displacement or pressure; practically the same minimum quantity of fluid will be present in the turbine compartment at any moment, because the pump cannot force it in any faster than it takes it out. The higher the pump rotor speed, the greater the fluid displacement per unit of time, and the greater the developed pressure, velocity and power transmitted to the turbine rotor. In view of the laws governing the mechanical equivalent of heat, it will be observed that the same minimum volume of fluid could not be circulated under continuous operating conditions without ultimately reaching dangerous temperatures; hence provision must be made for the dissipation of excessive heat, either by by-passing a portion of the said fluid through a suitable cooling coil or radiator, as previously mentioned, or water-jacketing the transmission case, or finning it for air cooling. Any or all of these methods may be employed and it is also desirable to employ a fluid possessing a very high vaporization point when same is to be used continuously.

The centrifugal action of the turbine rotor throws most of the injected fluid outwardly against the inner periphery of the turbine compartment and the direction in which its curved wall forces the fluid to flow therein is indicated by the arrows in Fig. 3. This action forces the air or vapor therein toward a central position within the turbine compartment. When this air starts expanding under the influence of generated heat, it is allowed to slowly escape to the outer air through the breather tube 49, thus maintaining normal internal air pressure. The circular baffle 51 encloses the end-thrust bearing 27 and prevents same from throwing fluid into the lower open end of the tube 49. As heat is dissipated, air may re-enter the housing through this tube to effect equalization of air pressure therein.

With a minimum fluid content within the housing 33 and the centrifugal pump rotor 2 running at full speed, or at any intermediate speed, the speed and power of the turbine rotor 5 may be altered by means of the control valve 14. If this valve is partly closed, the speed and power of the turbine rotor 5 will decrease. If the valve is completely closed, the pump rotor 2 will instantly force all fluid out of its compartment 18 into the turbine compartment 19 and the turbine will stop rotation and at the same time the load on the pump will be reduced to a minimum, because it cannot do useful work without fluid. The emplacement of the control valve 14 in the low pressure or suction channel 34 is therefore highly advantageous for this reason. Also the position of this valve 14 in the suction channel permits the use of fluid from an external source, as will be fully explained hereinafter.

The stoppage of fluid flow may be accomplished by setting the valve disc 14 in the position of either the dotted lines B—B, or C—C of Fig. 10.

With the valve set in either position, the reversing lever 12, may be pushed forward as indicated, thus bringing the rollers 31 and 31a (see Figs. 1 and 4) into contact with the rear face of the turbine member 5. Further pressure on lever 12 forces the cone face of the turbine rotor into pressure contact with the clutch lining sectors 4 of clutch plate 3, against the tension of the spring 25. When sufficient pressure is applied, the resultant frictional contact with members 5 and 3 will drive the turbine rotor in a reverse or anticlockwise direction, this clutch rotation, indicated by the dotted line arrow in Fig. 6, being the reverse of the direction of hydraulic rotation, which is indicated by the arrow in full lines in Fig. 6. Thus the turbine rotor and its shaft 21 are impelled to rotate by mechanical means, in the same direction as the drive shaft 1.

The degree or value of power and speed thus transmitted to the driven shaft 21 is determined by the degree of pressure applied to the reversing lever 12, or slippage of the turbine clutch member 53, the said value of which may be fixed at some pre-determined optimum as hereinbefore explained.

When the reversing lever 12 is released, the spring 25 (Fig. 1) instantly forces the turbine clutch member 5 back out of engagement with the clutch member 3 and the turbine rotor and its shaft are quickly stopped because of the fluid reaction or opposition to its continued rotation in the reverse direction. It will be remembered that when the valve 14 was closed, the centrifugal pump rotor forced all the fluid from its compartment over into the turbine compartment and the fluid level therein was increased thereby and while the said turbine rotor was running in the direction of the rotor when operating as a transmitting element friction clutch, this excess fluid was thrown outwardly against the inner periphery of the turbine compartment, but in the opposite direction to that indicated by the arrows in Fig. 3.

When the clutch faces are disengaged and the turbine rotor slows down, this fluid falls to the sump 8 and may partly submerge the lower part of said rotor, the reaction of which quickly stops rotation of same. If the control valve is again opened, fluid is drawn into the pump rotor compartment and again forced against the turbine rotor vanes to cause rotation of same in the opposite direction of pump rotor rotation as hereinbefore explained.

To synchronize the closing of valve 14 with the contacting of the clutch surfaces, a connecting rod 16 (Fig. 10), is provided. This rod is preferably constructed in two parts as shown. One part 71 is threaded on one end to adjustably fit into a threaded U-piece 72, which is suitably connected to the reversing lever 12. The opposite end is slightly fitted in the enlarged tubular end of the other part 73 and abuts a spring 74 therein and is provided with a retaining pin 75, which may slide longitudinally in the slot 76 of the tubular section 73. The opposite end of this part of the rod is suitably connected to the operating arm 15 of the valve 14, as shown in Fig. 10.

When the lever 12 is forced forward, the valve is closed before actual clutch contact is made, then additional forward movement of said lever 12 is absorbed by the spring 74, thus permitting maximum clutch contact without unduly stressing said valve 14. When lever 12 is released, the clutch members separate before valve 14 is opened, thereby preventing conflict of hydraulic and mechanical driving forces, which might otherwise greatly neutralize each other.

However, it is to be noted that this connecting rod 16 may be omitted and the two levers, 12 and 15, operated independently either manually, or by other media. It is also to be noted that, under certain operating conditions, a condition of neutralization of driving forces may be desirable, wherein the driven shaft 21 may be brought to a very slow stop in either direction of rotation, or maintained in rotation at very low speeds with less variation in R. P. M. than could be secured by means of reduced valve opening or clutch pressure and also quicker acceleration in either direction, by eliminating one or the other of the opposing forces.

If it is desired to employ fluid from an external source and then discharge that fluid externally, instead of employing a self-contained quantity, as hereinbefore described, the plugs 58 and 59 (Fig. 1), are removed and any suitable intake pipe substituted for the plug 58 and any suitable discharge pipe for the plug 59. The intake pipe will extend to a source of fluid, while the discharge pipe may extend to the same source or elsewhere.

The connecting rod 16 is disconnected and the valve disc 14 is now placed in the dotted line position B—B of Fig. 10 and an air-tight cap (not shown) is screwed tightly on the breather tube connection 50 (Fig. 1). The valve now cuts off communication between the suction head 17 and the sump 8, while preserving communication between said suction head and the intake at 58; while the said cap prevents the escape of air from the turbine chamber. The maximum suction lift must not exceed 22 feet and should preferably be less and a suitable check-valve (not shown) should be inserted in the intake pipe line in the conventional manner.

After the pump has been properly primed and started, fluid will be drawn in through the intake 58 and forced against the turbine rotor as before. However, this fluid, at full pressure, cannot flow out the discharge by gravity as rapidly as the pump forces it into the turbine chamber. Hence the fluid level will rise in this chamber, thereby compressing the air therein until the increased air pressure acting against the nozzle area 32, (Fig. 3) causes a back pressure on the injected stream, reducing its rate of flow and at the same time exerting pressure on the sump fluid to expel it more rapidly through discharge pipe at 59. Thus, at any given pump speed, the maximum fluid content of the turbine chamber will be proportional to the air pressure therein. However, as this chamber is to be made air tight, a predetermined air pressure may be maintained from an external source, if desired, so as to permit a maximum fluid displacement with minimum fluid drag on the turbine rotor. For certain applications of the transmission, this arrangement provides for a greatly increased volume of fluid, the temperature of which may be easily controlled externally.

The speed and power of the turbine rotor is controlled by the valve 14, as previously explained, except, in this case, these factors are reduced by opening this valve toward the fully open position M—M (Fig. 10), and completely stopped by turning said valve to the dotted line position C—C of Fig. 10.

If the lift is not too great, the pump may maintain a fluid flow with the valve at or near the fully open or M—M position, by drawing some fluid from the sump and some from the inlet pipe, sufficient to keep the channel 34 completely filled with fluid; otherwise it might pump air from both sources. However, a valve position just short of the fully open position M—M may be found, dependent upon pump speed, where a sufficient fluid level may be maintained in the sump to prevent air intake.

Fluid may be conducted to the intake 58 by gravitational flow, or under pressure if desired. Very little heating will be encountered over long periods of operation if a sufficient radiation system is employed, or if a sufficient external supply of fluid is provided, and whatever this factor, it can be effectively controlled by one or the other of said means. When water is substituted for any other fluid and drawn from external sources, there will be no heating effect as it can be discharged to waste channels.

The nozzle 77 (see Figs. 3 and 8) is a tapered tubular sleeve insert, pressed into its seat as shown, and with its lesser diameter 32 positioned inwardly near the turbine rotor 5. This insert 77 may have any desired taper bore of nozzle outlet area. With a given head or fluid pressure in the channel 7, the smaller the nozzle outlet, within reasonable limits, the greater the velocity of fluid impact upon the vanes of turbine rotor 5, and consequently the higher the R. P. M. of said rotor. If the restriction of nozzle discharge areas is not excessive, there will be little reduction of torque, but on the contrary there may be an increase of both torque and speed of rotation, under a given decreased load condition. Thus, under such decreased load, the turbine rotor may attain a higher R. P. M. than that of the centrifugal pump rotor; or, in other words, an automatic over-drive operating characteristic. This over-drive effect will automatically take place at some definite R. P. M. of the pump rotor with respect to the load on the turbine rotor below the latter's maximum power capacity.

The nozzle insert 77 is emplaced in an inwardly protruding boss 78, as shown in Fig. 3, which is preferably cast integral with the turbine housing compartment and around which boss a suitably shaped fillet 79 is formed. This fillet is provided with a curved face 80 as shown, against the face of which the fluid from the turbine rotor vanes is deflected, as shown in Fig. 3, the reaction of which increases the torque of said rotor and also aids in directing the flow of said fluid around the opposite half of the inner periphery of the turbine chamber, as shown. When this fluid reaches the sump 8, it encounters the circular faced baffle 9, which extends from the rear face of the housing to the partition or wall 10, as shown in Fig. 9 and which arrests the fluid and produces a vortex or whirlpool effect at the point of greatest suction. This fluid action insures a maximum fluid volume concentrating at the intake of channel 34, even though the drive end of the transmission is elevated considerably while the device is in operation. Thus the axis of the transmission may be elevated or depressed, above or below the horizontal a reasonable degree, or altered any degree from side to side without affecting its operation, and, of course, under such operating conditions, a special mounting, suitable for the purpose, would be provided.

While I have described but one nozzle and turbine structure, I anticipate the use of a plurality of nozzles and turbine rotors, as shown in Fig. 13, the rotors being slidably keyed onto one shaft 21, as shown and preferably inter-connected to form a unit rotor assembly 5a with one clutch face 53, whereby to operate substantially as hereinbefore described.

The term "breather tube" as used in the claims is to be construed as covering both elements 49 and 50.

What I claim is:

1. In a reversible hydro-mechanical transmission, the combination of a centrifugal pump and chamber for same, a friction clutch, a hydraulic turbine, the turbine driving the device in one direction and the clutch causing reversal, a housing unit within which all of the aforesaid mechanisms are contained, and including communicating channels from the centrifugal pump chamber to the hydraulic turbine chamber, whereby a fluid within the housing may be pumped to and from the hydraulic turbine, and means to accomplish a quick reversal of rotation through pressure applied to the aforesaid clutch, the power transmitted by the clutch being dependent upon clutch slippage.

2. In a reversible hydro-mechanical transmission, the combination of a centrifugal pump and chamber for same, a friction clutch, a hydraulic turbine, the turbine operating the driven members in a reverse direction from that in which the clutch means operate same, a housing unit within which all of the aforesaid mechanisms are contained, and including communicating channels from the centrifugal pump chamber to the hydraulic turbine chamber, whereby a fluid within the housing may be pumped to and from the hydraulic turbine chamber, and means whereby hydraulic action is completely stopped at or before the instant of clutch engagement so as to prevent conflict of driving forces under certain conditions.

3. In a reversible hydro-mechanical transmission, the combination of a centrifugal pump and chamber for same, a friction clutch, a hydraulic turbine, a housing unit within which all of the aforesaid mechanisms are contained, and including a communicating channel from the centrifugal pump chamber to the hydraulic turbine chamber, whereby a fluid within the housing may be pumped to and from the hydraulic turbine chamber, and means whereby the power transmitted and the speed of rotation of the driven shaft may be increased or decreased or completely stopped while the centrifugal pump is rotating at any given speed, the turbine driving the device in one direction and the clutch causing reversal.

4. In a reversible hydro-mechanical transmission, the combination of a centrifugal pump and chamber for same, a friction clutch, a hydraulic turbine, a housing unit within which all the aforesaid members are contained and including communicating channels from the chamber containing the centrifugal pump to the hydraulic turbine chamber, a predetermined minimum quantity of fluid in said housing, and means to regulate the circulation of this fluid under pressure to regulate the transmission of power in one direction of rotation by reason of the impact of the fluid against the vanes of the hydraulic turbine rotor, the turbine driving the device in one direction and the clutch causing reversal.

5. In combination with the mechanism defined in claim 4, means whereby fluid may be drawn from an external source by the centrifugal pump and forced against the turbine rotor and then exhausted externally.

6. In a reversible hydro-mechanical transmission, the combination of a drive shaft, a driven shaft aligned with but only loosely connected with the drive shaft and capable of being driven in a reverse direction relative to said drive shaft, a centrifugal pump rotor affixed to the drive shaft, a pump compartment in which said rotor is mounted, a clutch member affixed to the drive shaft, a turbine rotor slidably keyed to the driven shaft and carrying an integral clutch member, a compression spring interposed between the aforesaid clutch members and adapted to space them apart, means for causing the two clutch members to be engaged, a housing unit containing all of the aforesaid members, communicating channels from the centrifugal pump compartment to the compartment in which the turbine rotor is mounted, and a suction channel extending from the compartment in which the turbine rotor is mounted to the pump rotor compartment.

7. In a reversible hydro-mechanical transmission, the combination of a drive shaft, a driven shaft aligned with but only loosely connected with the drive shaft and capable of being driven in a reverse direction relative to said drive shaft, a centrifugal pump rotor affixed to the drive shaft, a pump compartment in which said rotor is mounted, a clutch member affixed to the drive shaft, a turbine rotor slidably keyed to the driven shaft and carrying an integral clutch member, a compression spring interposed between the aforesaid clutch members and adapted to space them apart, means for causing the two clutch members to be engaged, a housing unit containing all of the aforesaid members, a communicating channel from the outlet of the centrifugal pump compartment to the compartment in which the turbine rotor is mounted, a suction channel extending from the compartment in which the turbine rotor is mounted to the intake of the pump rotor compartment, and a valve mounted in the suction channel and adapted to regulate or interrupt the flow of fluid through said channel from the turbine compartment to the centrifugal pump compartment.

8. In a reversible hydro-mechanical transmission, the combination of a drive shaft, a driven shaft aligned with but only loosely connected with the drive shaft and capable of being hydraulically driven in a reverse direction relative to said drive shaft, a centrifugal pump rotor affixed to the drive shaft, a pump compartment in which said rotor is mounted, a clutch member affixed to the drive shaft, a turbine rotor slidably keyed to the driven shaft and carrying an integral clutch member, a compression spring interposed between the aforesaid clutch members and adapted to space them apart, means for causing the two clutch members to be engaged, a housing unit containing all of the aforesaid members, a communicating channel from the centrifugal pump outlet to the compartment in which the turbine rotor is mounted, a suction channel extending from the compartment in which the turbine rotor is mounted to the intake of the pump rotor compartment, a valve mounted in the suction channel and adapted to regulate or interrupt the flow of fluid through said suction channel from the turbine compartment to the centrifugal pump compartment and a breather tube mounted in the compartment containing the turbine rotor to regulate air or vapor pressure in said chamber.

9. In a reversible hydro-mechanical transmission, the combination of a drive shaft, a driven shaft aligned with but only loosely connected with the drive shaft and capable of being driven in a reverse direction relative to said drive shaft, a centrifugal pump rotor affixed mechanically to the drive shaft, a pump compartment in which said rotor is mounted, a clutch member affixed to the drive shaft, the pump rotor and the clutch on the drive shaft always rotating in the same direction at the same speed, a turbine rotor mounted on the driven shaft and carrying a clutch member, said turbine rotor and clutch member being slidably keyed on the driven shaft and rotatable in either direction and at various speeds, means for causing the two clutch members to be engaged, a housing unit containing all of the aforesaid members, a communicating channel from the centrifugal pump compartment to the compartment in which the turbine rotor is mounted, and a suction channel extending from the compartment in which the turbine rotor is mounted to the pump rotor compartment, and a valve in the suction channel to control the flow of fluid to the pump compartment.

10. In a reversible hydro-mechanical transmission, the combination of a drive shaft, a driven shaft aligned with but only loosely connected with the drive shaft and capable of being hydraulically driven in a reverse direction relative to said drive shaft, a centrifugal pump rotor affixed to the drive shaft, a pump compartment in which said rotor is mounted, a clutch member affixed to the drive shaft, the pump rotor and the clutch on the drive shaft always rotating in the same direction at the same speed, a turbine rotor mounted on the driven shaft and carrying a clutch member, said turbine rotor and integral clutch member being slidably keyed on the driven shaft and rotatable in either direction and at various speeds, means for causing the two clutch members to be engaged, a housing unit containing all of the aforesaid members, a communicating channel from the centrifugal pump compartment to the compartment in which the turbine rotor is mounted, a suction channel extending from the compartment in which the turbine rotor is mounted to the pump rotor compartment, a valve in the suction channel to control the fluid to the pump compartment, and a reversing lever operatively connected with the turbine rotor, and a compressible rod operatively connecting the reversing lever with the aforesaid valve in the suction channel whereby the control of fluid flow and clutch action may be synchronized.

11. In a reversible hydro-mechanical transmission, the combination of a drive shaft, a driven shaft aligned with but only loosely connected with the drive shaft and capable of being hydraulically driven in a reverse direction relative to said drive shaft, a centrifugal pump rotor affixed to the drive shaft, a pump compartment in which said rotor is mounted, a clutch member affixed to the drive shaft, the pump rotor and the clutch on the drive shaft always rotating in the same direction at the same speed, a turbine rotor mounted on the driven shaft and carrying a clutch member, said turbine rotor and integral clutch member being slidably keyed on the driven shaft and rotatable in either direction and at various speeds, means for causing the two clutch members to be engaged, a housing unit containing all of the aforesaid members, a communicating high pressure channel from the centrifugal pump compartment to the compartment in which the turbine rotor is mounted, a suction channel extending from the compartment in which the turbine rotor is mounted to the pump rotor compartment, a valve in the suction channel to control the flow of fluid to the pump compartment, and a reversing lever operatively connected with the turbine rotor, and a compressible rod operatively connecting the reversing lever with the aforesaid valve in the suction channel whereby the control of fluid flow and clutch action may be synchronized, and means whereby said members may be disconnected.

12. In a reversible hydro-mechanical transmission, the combination of a centrifugal pump, a pump chamber for same, a drive shaft, a friction clutch member affixed to the drive shaft, a hydraulic turbine, a shaft on which the hydraulic turbine is slidably keyed, said shaft being aligned with and having a loose connection with the driven shaft, the turbine having a clutch member positioned and shaped to coact with the first-mentioned clutch member, and means for causing the two clutch members to be engaged, the clutch member of the turbine rotor having a central bored out chamber, and the clutch plate on the drive shaft having spaced clutch lining segments whereby to provide intermediate spaces for immediate and thorough discharge of any fluid in the aforesaid bored out chamber when the clutch members are forced together while the device is in operation.

13. In a reversible hydro-mechanical transmission, the combination of a drive shaft, a driven shaft aligned with but only loosely connected with the drive shaft and capable of being driven in a reverse direction relative to said drive shaft, a centrifugal pump rotor affixed to the drive shaft, a pump compartment in which said rotor is mounted, a clutch member affixed to the drive shaft, a turbine rotor mounted on and slidably keyed to the driven shaft and carrying an integral clutch member, and means for causing the two clutch members to be engaged, a compression spring interposed between the aforesaid clutch members and adapted to normally space them apart, a housing unit containing all of the aforesaid members, a communicating channel from the centrifugal pump compartment to the compartment in which the turbine rotor is mounted, a suction channel extending from the compartment in which the turbine rotor is mounted to the pump rotor compartment, a suction head through which the suction channel extends, said suction head having a baffle plate integral with the suction head and extending above the top level of the centrifugal pump rotor, and around which the suction channel extends, to provide for a self-priming action of the pump.

14. In a reversible hydro-mechanical transmission, the combination of a drive shaft, a driven shaft aligned with but only loosely connected with the drive shaft and capable of being hydraulically driven in a reverse direction relative to said drive shaft, a centrifugal pump rotor affixed to the drive shaft, a pump compartment in which said rotor is mounted, a clutch member affixed to the drive shaft, a turbine rotor mounted on the driven shaft and carrying an integral clutch member, and means for causing the two clutch members to be engaged, a compression spring centrally positioned between the clutch member affixed to the drive shaft and the turbine rotor clutch member to separate the surfaces while the turbine is rotating under hydraulic action, and a ball bearing engaging one end of said spring and relieving all torsional stresses on said spring when the clutch members on the drive shaft and the turbine rotor clutch are rotating in opposite directions, a communicating channel from the centrifugal pump compartment to the turbine rotor compartment, and a suction channel extending from the turbine rotor compartment to the pump rotor compartment.

15. In a reversible hydro-mechanical transmission, the combination of a drive shaft, a driven shaft aligned with but only loosely connected with the drive shaft and capable of being driven in a reverse direction relative to said drive shaft, a centrifugal pump rotor affixed to the drive shaft, a pump compartment in which said rotor is mounted, a clutch member affixed to the drive shaft, a turbine rotor mounted on the driven shaft and carrying an integral clutch member, and means for causing the two clutch members to be engaged, a compression spring centrally positioned between the clutch member affixed to the drive shaft and the turbine rotor clutch member to separate the surfaces while the turbine is rotating under hydraulic action, a ball bearing engaging one end of said spring and relieving all torsional stresses on said spring when the clutch member on the drive shaft and turbine rotor clutch are rotating in opposite directions, a partition between the pump compartment and the turbine rotor compartment, a circular flange on said partition, said flange projecting into the said turbine compartment and a breather tube extending into the turbine compartment, said tube having its lower end beveled and positioned close to the top side of the aforesaid circular flange.

16. In a reversible hydro-mechanical transmission, the combination of a drive shaft, a driven shaft aligned with but only loosely connected with the drive shaft and capable of being driven in a reverse direction relative to said drive shaft, a centrifugal pump rotor affixed to the drive shaft, a pump compartment in which said rotor is mounted, a clutch member affixed to the drive shaft, a turbine rotor mounted on and slidably keyed to the driven shaft and carrying an integral clutch member, and means for causing the two clutch members to be engaged, a compression spring interposed between the aforesaid clutch members and adapted to space them apart, a housing unit containing all of the aforesaid members, a communicating channel from the centrifugal pump compartment to the compartment in which the turbine rotor is mounted, a suction channel extending from the compartment in which the turbine rotor is mounted to the intake of the pump rotor compartment, a valve mounted in the suction channel and adapted to regulate or interrupt the flow of fluid through said channel from the turbine compartment to the centrifugal pump compartment, a reversing lever, a pair of aligned resiliently connected rods, one of said rods being operatively connected to the aforesaid valve in the suction channel at one end, and the other of said rods being operatively connected to the reversing lever at the other end, the reversing lever being operatively connected with the turbine rotor to cause a movement of same whereby to operate the clutch mechanism and reverse the direction of rotation of the turbine rotor.

HARLIE O. PUTT.